No. 845,331. PATENTED FEB. 26, 1907.
O. BRIEDE.
MACHINE FOR MAKING RIVETS, &c.
APPLICATION FILED MAY 23, 1905.

2 SHEETS—SHEET 1.

WITNESSES:
Herbert Bradley
Francis Vornan

INVENTOR
Otto Briede,
by Christy & Christy, Atty's

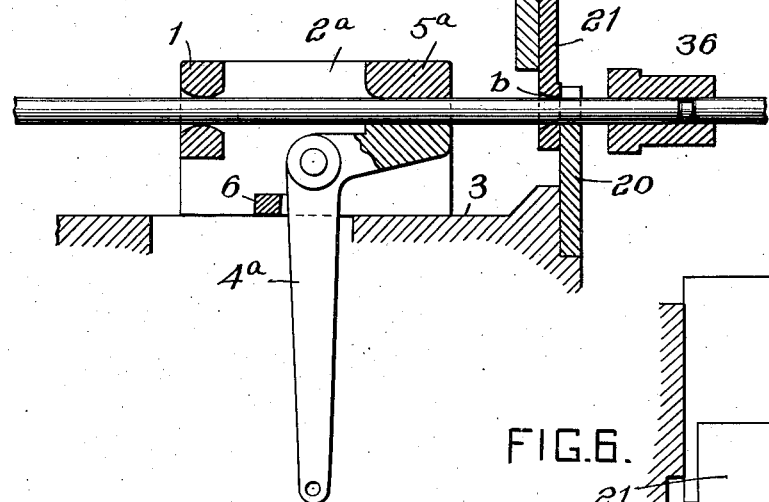
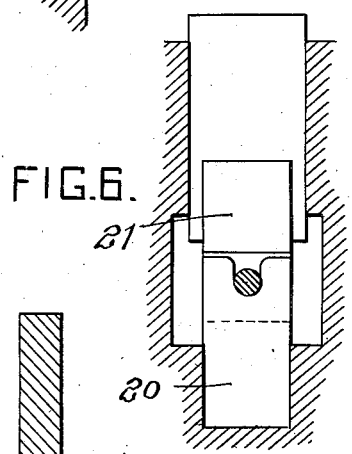
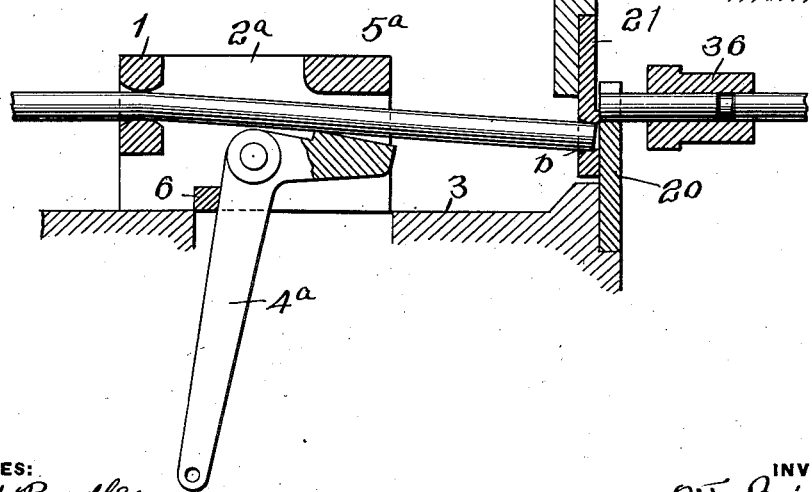

UNITED STATES PATENT OFFICE.

OTTO BRIEDE, OF BENRATH, GERMANY.

MACHINE FOR MAKING RIVETS, &c.

No. 845,331.    Specification of Letters Patent.    Patented Feb. 26, 1907.

Application filed May 23, 1905. Serial No. 261,815.

*To all whom it may concern:*

Be it known that I, OTTO BRIEDE, a subject of the German Emperor, residing at Benrath, near Düsseldorf, Germany, a citizen of Benrath, near Düsseldorf, have invented or discovered certain new and useful Improvements in Machines for Making Rivets, &c., of which improvements the following is a specification.

In an application filed on or about October 3, 1904, and numbered serially 227,072 I have described and shown certain improvements in machines for the manufacture of bolts, rivets, &c.

The invention described herein relates to certain improvements in that part of the mechanism shown in the application referred to employed for feeding the rod and cutting the blanks from the end thereof.

The invention is hereinafter more fully described and claimed.

Figure 1:
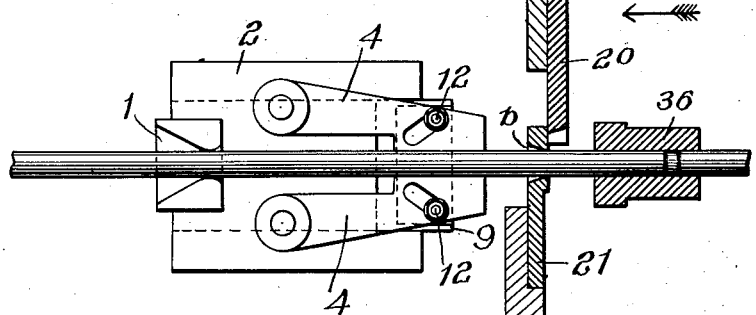
Figure 3:
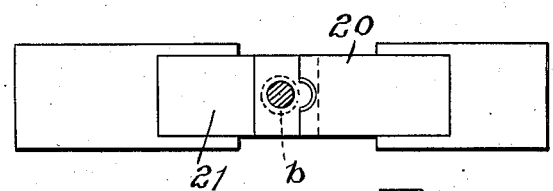
Figure 2:
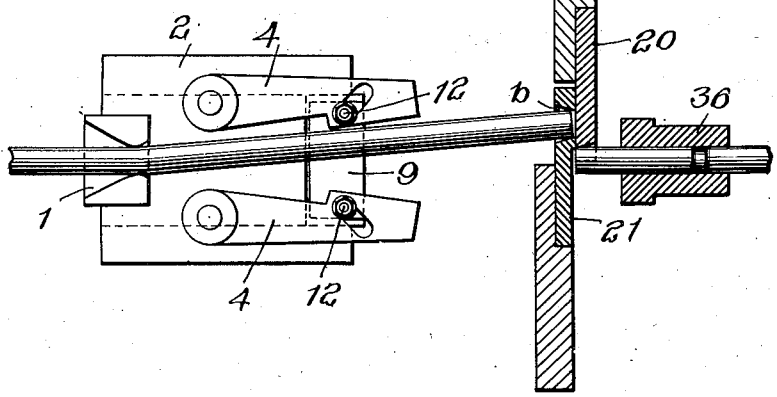

In the accompanying drawings, forming a part of this specification, Figure 1 is a sectional elevation showing the feeding mechanism, the shearing mechanism, and one of the holders in which the blank is held while being upset or headed. Fig. 2 is a view similar to Fig. 1, showing the several parts in the position they occupy after the shearing of a blank, and Fig. 3 is a view looking in the direction of the arrow *a* in Fig. 1, the blank-holder being omitted. Figs. 4 and 5 are views similar to Figs. 1 and 2 and illustrate a modification in the construction of the feed mechanism, and Fig. 6 is a side view of the knives in the position shown in Fig. 4.

In the practice of my invention as illustrated in Figs. 1, 2, and 3 the arms 4 of the feed mechanism described in the application referred to are pivotally mounted, as stated in said application, upon a sliding bed 2, which is operated back and forth in a manner substantially similar to that employed in said machine. These arms are provided with gripping edges to grasp the bar from which the rivets are to be formed and are adapted to be moved toward and from each other by means of angular slots formed in a block 9, movable back and forth on the slide, pins 12 on the arms projecting into such slots. As stated in said application, the block is connected to an operating-lever whereby the reciprocation of the parts is effected, the slide being moved by the block 9. In lieu of employing four radially-acting blades, as described in said application, I employ two blades 20 and 21, movable toward and from each other by any suitable means known in the art, but preferably that employed in the application referred to. One of the blades, as 20, is provided with a notch or groove in its operative end, and the other blade is provided with an eye *b*, through which the rod from which the rivets are to be cut is passed.

In the operation of the construction shown in Figs. 1, 2, and 3 the bar or rod from which the rivets, &c., are to be cut is passed through a guide-block 1, mounted on the slide 2. This block, as shown, is provided with a flaring mouth and with curved bearing portions for the rod, so that the latter may be moved laterally, as hereinafter described. By the forward movement of the slide 2, the jaws on the levers 4 being in engagement with the rod, the latter is pushed through the eye in the blade 21 into the blank-holder 36. The blades 20 and 21 are then moved toward each other, the blade 20 having a stroke sufficient to cause it to bear firmly against the rod while in the position shown in Fig. 1. The blade 21 moving along the blade 20 will shear the rod and also will deflect the inner end of the rod to one side, as indicated in Fig. 2, without drawing the inner end of the rod from the eye. Simultaneous with this inward movement of the blades, and preferably beginning just as the blades get a grip on the rod, the slide 2 is moved backward so as to open the jaws, as shown in Fig. 2, and thereby permit of the deflection of the inner end of the rod, as shown.

In lieu of the construction shown in Figs. 1, 2, and 3 I may employ that shown in Figs. 4, 5, and 6. In this construction a block 2ª is movably mounted upon a bed 3 and has formed thereon a guiding-eye 1 and a bearing or abutment 5ª. A bell-crank lever 4ª is pivotally mounted on the block 2ª in such position that a jaw on one of the arms of the bell-crank will operate in conjunction with the abutment 5ª to grip the bar or rod. The opening and closing movement of the gripping members is effected preliminary to the movement of the slide by the operation of suitable mechanism connected to the tail of the bell-crank, and the movement of the slide itself is effected by the bell-crank. When the bell-crank is shifted to close the jaws on the rod, it will be held from further movement independent of the slide, and the latter will be thereafter moved forward by the lever. When the lever is moved in the opposite direction to open the jaws, it will after the jaws have opened a sufficient distance strike against a stop 6, so that thereafter the slide will move back with the lever. A suitable mechanism for the operation of the slide or clamping-jaws is shown and described in application Serial No. 227,072, filed by me October 3, 1904. In this construction the blade 20 is secured to the bed on which the slide moves, and the blade 21 is reciprocated back and forth by any suitable means. In this construction, as in that shown in Figs. 1, 2, and 3, the jaws are opened and the slide moved backward immediately after the blades have by the movement of the movable member gripped the bar or rod. By this opening of the jaws the deflection of the inner end of the bar or rod is permitted.

I claim herein as my invention—

1. In a machine for making rivets, &c., the combination of shearing-blades, one movable relative to the other, a reciprocating slide, gripping-jaws carried by the slide, one of said jaws movable with one of the blades during the shearing operation.

2. In a machine for making rivets, &c., the combination of shearing-blades, one movable relative to the other, a reciprocating slide, gripping-jaws carried by the slide, means for shifting one of the jaws with one of the blades during the shearing operation, and connections whereby the slide is shifted by the movable jaw.

3. In a machine for making rivets, &c., the combination of shearing-blades, one of said blades being provided with an eye for the reception of the bar or rod to be sheared, a reciprocating slide, gripping-jaws carried by the slide and means for shifting one of said jaws with the blade having the eye.

4. In a machine for making rivets, &c., the combination of shearing-blades one of said blades provided with an eye and the other blade having a notch or recess in line with the eye in the other blade, a reciprocating slide, gripping-jaws carried by the slide and means for moving one of said jaws with the blade having the eye.

In testimony whereof I have hereunto set my hand.

OTTO BRIEDE.

Witnesses:
WILLIAM ESSENWEIN,
FRANK HESSENBUCH.